(12) United States Patent
Vermeer

(10) Patent No.: US 6,370,477 B1
(45) Date of Patent: *Apr. 9, 2002

(54) COMPRESSION METHOD AND APPARATUS FOR SEISMIC DATA

(75) Inventor: Pieter Leonard Vermeer, Histon (GB)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/605,511

(22) Filed: Jun. 28, 2000

Related U.S. Application Data

(63) Continuation of application No. 09/077,634, filed as application No. PCT/GB96/02885 on Nov. 22, 1996, now Pat. No. 6,104,982.

(51) Int. Cl.⁷ .................................................. G01V 1/32
(52) U.S. Cl. .......................................... 702/14; 367/74
(58) Field of Search ....................... 702/14, 17; 367/74; 341/51, 87

(56) References Cited

U.S. PATENT DOCUMENTS

| 4,599,567 A | | 7/1986 | Goupillaud et al. | 324/77 |
| 4,906,995 A | * | 3/1990 | Swanson | 341/87 |
| 5,663,929 A | | 9/1997 | Pavone et al. | 367/82 |
| 6,104,982 A | * | 8/2000 | Vermeer | 702/14 |

FOREIGN PATENT DOCUMENTS

| EP | 0 660 136 A2 | 6/1995 | G01V/1/48 |
| EP | 0 684 363 A1 | 11/1995 | E21B/47/12 |
| GB | 1 377 594 | 1/1973 | G06F/15/34 |
| WO | WO 97/21115 | 6/1997 | G01V/1/22 |

OTHER PUBLICATIONS

Abstract AZ5106399. Nijam, Stearns and Michael. Lossless compression of Seismic Signals . . . Apr. 28—May 3, 1995.
Abstract AZ–03960838. Spanias, Jonsson and Stearns. Transform Methods for Seismic Data Compression. May 1991.
Abstract AZ–03853591. Spanias, Jonsson, Stearns. Transform Coding Algorithms for Seismic Data Compression. 1990.
Abstract AZ–03799696. Jonsson, Spanias. Seismic Data Compression. 1990.
Abstract AZ–00627108. Stone. Geophysical Prospecting. Pulse Compression for Seismic Data. Sep. 1973.
Spanias et al., Transform Coding Algorithms for Seismic Data Compression, IEEE Int. Sym Circuits & Systems, New Orleans, LA, May 1–3, 1990, vol. 2, 1573–6.
H.S. Malvar, Lapped Transforms for Efficient Transform/Subband Coding, IEEE ASSP, vol. 38, No. 6, Jun. 1990.
Nijim, et al. Lossless Compression of Seismic Signals Using Least Square, Frequency Domain Pole–Zero Modeling. *Proceedings of ISCAS 1995*. (Apr. 28–May 3, 1995) pp. 1106–1109.
Spanias, et al. Transform Methods for Seismic Data Compression. *IEEE Transactions on Geoscience and Remote Sensing*. vol. 29, No. 3 (May 1991) pp. 407–416.
Jonsson et al. Seismic Data Compression. 9$^{th}$ Peonix Conferences on Computers and Communications. (Mar. 21–23, 1990) pp. 276–279.

* cited by examiner

*Primary Examiner*—Donald E. McElheny, Jr.
(74) *Attorney, Agent, or Firm*—William B. Batzer; William L. Wang

(57) ABSTRACT

Methods and apparatus for seismic data compression are described, making use of a local discrete sine/cosine transform of the type IV applied to a data set which is limited by a stationary window function which reduces the overlap to the adjoining windows.

27 Claims, 5 Drawing Sheets

COMPRESSION METHOD AND APPARATUS FOR SEISMIC DATA

RELATED APPLICATIONS

This application is a continuation of U.S. patent application Ser. No. 09/077,634 filed on Aug. 13, 1998, now U.S. Pat. No. 6,104,982, which is hereby incorporated herein by reference, which is a 371 of PCT/GB96/02885 Nov. 22, 1996.

FIELD OF THE INVENTION

This invention relates to compression methods and apparatus for seismic data.

BACKGROUND OF THE INVENTION

Data compression (or reduction) is a digital signal processing technique for reducing the amount of data to be dealt with without losing essential information in the process. This is essentially done by the removal of redundancy in the data and may involve the discarding of uninteresting parts of the data. Such compression can result in some loss of data accuracy. Data compression that allows the exact reconstruction of the original data is often referred to in the literature as lossless. Data compression that involves some reduction in accuracy is known as lossy. Common examples of data compression are "rounding" and "down sampling"; both methods are usually lossy.

Seismic data acquisition requires a large number of seismic experiments to be conducted in order to obtain a reliable image of the Earth's subsurface. Each experiment involves the generation of a sound wave using an appropriate source and measuring the earth's response by a large number of receivers. A large scale seismic survey thus produces an enormous amount of data which will normally be in digital format, which has to be transmitted, stored and processed. To facilitate the handling of such large volumes of data, data compression can be utilized.

A lossy data compression technique that is routinely used in seismic data acquisition is group forming. This involves the retention and transmission and processing of the sum of neighboring receivers within fixed-sized groups, instead of the individual measurements.

Group forming is not used primarily for data compression. Group forming suppresses random ambient noise and suppresses waves with low apparent velocities, such as groundroll in land seismics. Thus group forming attenuates the high spatial frequency content of the data. However, the attenuation is performed in a crude way as it only partially suppresses apparently slowly propagating waves and alters the rest of the data. Consequently there is a good reason to omit group forming from the acquisition stage and to record the output of every receiver individually. This then permits the application of more sophisticated methods for reducing random and coherent noise. However the abolition of group forming at the acquisition stage greatly increases the amount of data to be handled downstream.

In IEEE Int. SYM. Circuits & Systems, New Orleans, La., May 1–3, 1990, Vol. 2, 1573–6, A. Spanias, S. Johnson et al. describe several transform based methods for seismic data compression. The methods include the Discrete Fourier Transformation (DFT), the Discrete Cosine Transformation (DCT), the Walsh-Hardamard Transform (WHT), and the Karhunen-Loeve Transform (KLT). However the DCT in the form described in the publication and applied to a sliding frame of N data points can be used for a relative comparison between several different transformations. When applied as data compression method, the sliding frame produces a large amount of redundant data in the transform domain.

It is therefore an object of the present invention to provide a method for compressing seismic data. It is another object of the invention to provide a method for compressing seismic data without using group forming.

SUMMARY OF THE INVENTION

The invention provides a first level of compression in which local spatial or temporal discrete trigonometric (i.e. either sine or cosine) transformations of type IV are applied to seismic data signals (FIG. 4, step 314). Discrete sine/cosine transformations of type IV are known as such. A general description is given for example by H. S. Malvar in: "Lapped transforms for efficient transform/subband coding", IEEE ASSP, vol. 38, no. 6, June 1990. The local spatial or temporal discrete sine/cosine transformation results in transform coefficients which are more compact and less correlated that the original data. Both of these properties can be advantageously exploited in subsequent data processing steps.

The compactness of the transform coefficient is exploited in a processing step, which can be described as a requantization or round-off step. The purpose of this step is to retain selected coefficients at high accuracy and other coefficients at lesser accuracy so as to reduce the quantity of data needed to describe the coefficients and thereby achieve further data compression.

The reduced correlation of the transform coefficients provides an opportunity to apply encoding schemes so as to further reduce the amount of data to be stored or transmitted. Applicable coding schemes are known as such, e.g., Huffmann coding or Amplitude coding.

The seismic data signals to which the method is applied are traces typically obtained from a number of receivers, e.g. geophones or hydrophones (FIG. 4, step 310). These may be arranged in combinations all of which are well known in the prior art. One of these is, for example, a conventional 3-D land seismic layout of linear arrays of geophones arranged in a number of parallel lines. The use of local transformations in the method permits the compression of the data over a certain numbers of receivers contained within each line. A local transformation is one in which the transformation is applied over defined windows of traces, as is well understood in the art. Thus the number of traces over which the local transformation is applied at each successive stage of the transformation is referred to as a spatial window and the window may be varied according to which type of transformation is applied.

The windows of the local transformations are defined by a window function, the window function being chosen so that the transformation is orthonormal and invertible. The window function is chosen so that the transformations are applied over a central window overlapping the adjoining windows (FIG. 4, step 312), most preferably overlapping half of those windows.

The transformation may be performed in two steps, the first step comprising a folding step in which the central window is combined with adjacent half windows to produce a folded signal and the second step comprising compressing a cosine transformation which is performed on the folded signal.

In addition to the local spatial transformation, preferably a local temporal transformation is applied to the data. The combination of both local transformations achieves a better compression ratio. The local temporal transformation is preferably a local temporal discrete sine/cosine transformation of type IV. However other signal transformations and decompositions may be used, such as an ordinary local discrete cosine transformation, and a local fourier transformation. The local spatial trigonometric transformation and local temporal trigonometric transformation may be applied in any order.

The transform coefficients, as representing the original data after the transformation, form a set of data to which different compression methods can be applied (FIG. 4, step 316). These compression methods may be collectively referred to as (re-) quantization (FIG. 5, step 332) and encoding (FIG. 5, step 340).

The quantization process when used for compressing data usually includes a scaling step and a round-off. The quantization process is designed to reduce the high-frequency components or coefficients while maintaining the low-frequency components with higher accuracy.

The scaling is preferably achieved through dividing by first scalar coefficients representing low frequencies and dividing by second scalar coefficients representing high frequencies. The first scalar is chosen to be less than the second scalar, since the larger the scalar, the greater the compression which will be achieved. In this way the coefficients representing the low frequencies which are of particular interest in seismic analysis will not be compressed so much as these representing high frequencies, so that the accuracy of the former is preserved.

The scaling may be achieved by uniform quantizing (FIG. 5, step 334) using a nearest integer function, or by statistical rounding, or non-uniform requantization (FIG. 5, step 336).

The scaling or quantization parameters may vary with time, space or spatial or temporal frequency.

In a further preferred embodiment of the invention, the compression ratio is automatically determined by the noise level in the seismic signal. The noise level is preferably measured using a part or parts of the signal which contain no signal generated by the seismic source. Thus, part of the traces recorded prior to the "first arrival" or so-called noise records, i.e. traces recorded in the absence of a seismic source, can be utilized to determine the noise level. Even more preferably, the signal is filtered before the step of determining the noise level to avoid an overestimation of the noise level.

Preferably the compression ratio, i.e. the quantization error is chosen equal or lower than the noise level.

The reduction in accuracy caused by the compression of the data increases the redundancy in the data. Therefore according to a further feature of the invention, the data redundancy is used to further reduce the compressed data, preferably by applying variable-length data coding, such as Amplitude coding or Huffman coding. For example the scale coefficients may be amplitude encoded so that each coefficient becomes proportional to the absolute value of the largest coefficient.

The seismic data compression method in accordance with the invention can be applied to all types of seismic data, including 2D and 3D survey data of land, transition zone, marine or sea bottom acquisitions. Possible data also includes pre-recorded or pre-processed data, such as shot gathers, Common Midpoint (CMP) gathers, stacks, migrated sections or single sensor recordings. It is also suitable for use with a two dimensional seismic acquisition geometry, such as a land layout comprising one line of receiver, or for two- or three- dimensional marine seismic surveys using streamers and hydrophones, and application in two perpendicular directions to a true areal receiver layout (inline/crossline application).

Using dedicated chip sets, it is feasible to compress the data in a single receiver before transmission to field boxes or acquisition trucks or ships. It can also be used in data transmission further "down-stream" in the data processing, e.g. for the transmission of data to a processing center or for intermediate storage. After transmitting and/or storing the compressed data (FIG. 4, step 318), the original data can be reconstructed or decompressed by applying the same steps inverted and in reverse order (FIG. 4, step 320).

The invention also lies in apparatus for performing the methods described herein.

The invention also lies in a seismic survey in which data is subjected to compression according one or more of the foregoing methods.

These and other features of the invention, preferred embodiments and variants thereof, possible applications and advantages will become appreciated and understood by those skilled in the art from the detailed description and drawings following hereinbelow.

DRAWINGS

EXAMPLE(S)

Figure 1:
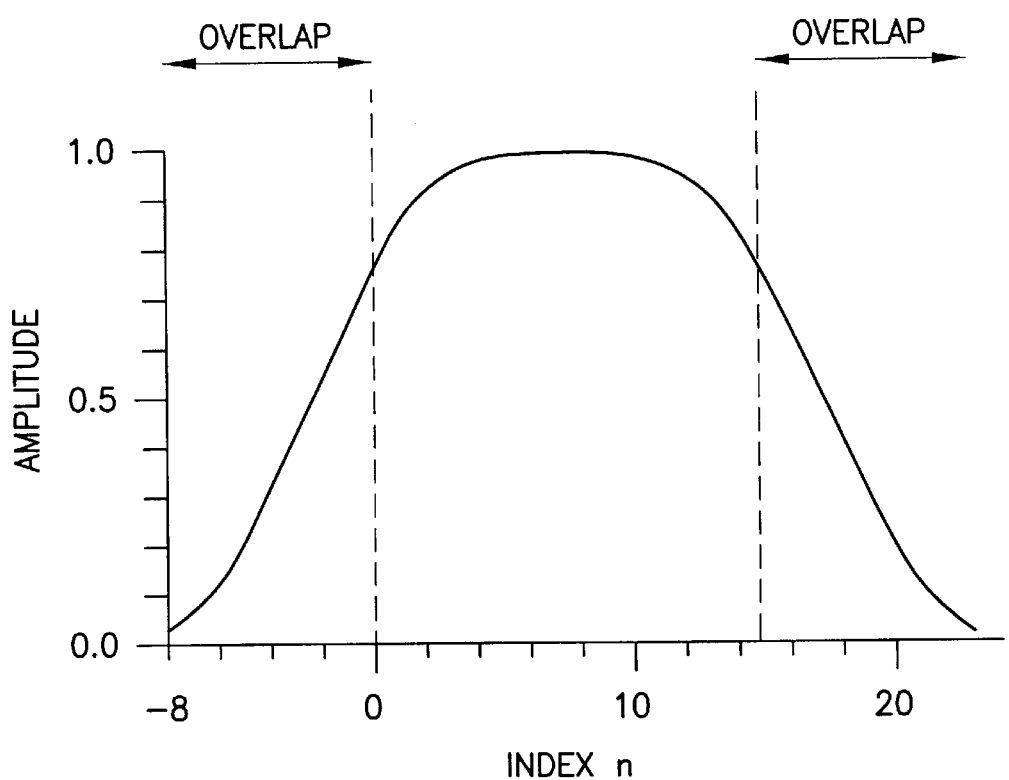
FIG. 1 shows a typical window designed in accordance with a preferred window function.

Typically in a conventional 3D land seismic layout, receivers are arranged in linear receiver arrays in a number of parallel lines.

In this embodiment, the data compression method is applied along each receiver line, and each receiver line may be dealt with separately. This application is called the inline application.

The conventional process of group forming, summing groups of receivers, is expressed mathematically as $$\vec{g}(i) = \frac{1}{N_g} \sum_{n=0}^{N_g-1} \vec{s}(n + iN_g); \quad i = 0, \ldots, I_g - 1 \quad [1]$$

where $N_g$ is the number of receivers per group, $I_g$ is the number of groups per receiver line, vector g contains the group formed data in group i, and vector s(n) contains the measured data in receiver n.

It can be seen in equation [1] that the number of samples in the group formed data is only a factor $1/N_g$ of the original amount of data.

The seismic data compression method according to the invention does not rely on this group forming, which is a crude way of retaining only the low spatial frequency content of the received signal. On the other hand, it avoids retaining all the data from the individual receivers. The new method retains the more important low spatial frequency content at high accuracy and retains the high spatial frequency content at a reduced, though still significant, accuracy. Reduction of accuracy means that less bits per data sample are required and thus data compression is achieved.

The method in accordance with the invention involves a number of stages that will be discussed below:

Stage 1: Spatial Transformation

A local cosine transformation of type IV, that is a cosine transformation within windows of a finite number of receivers is applied to the data, $$\vec{C}_{km} = \sum_{n=m/2}^{3M/2-1} \vec{s}(n+nM)h(n)\sqrt{\frac{2}{M}}\cos\left(\frac{\pi}{M}\left(k+\frac{1}{2}\right)\left(n+\frac{1}{2}\right)\right) \qquad [2]$$

for k=0, . . . , M−1, and for m=0, . . . , P−1.

In equation [2] vector $c_{km}$ is the local spatial DCT-IV coefficient, vector s(n) the measured data in receiver n, M the number of receivers per window in the local cosine transformation, h(n) a window function, and P the number of windows per receiver line.

In this particular equation M is assumed to be even, although M may be chosen to be odd with the appropriate modifications to the transformations. The above transformation is othonormal and invertible if the window function h(n) satisfies the conditions below $$0 \le h(n) \le 1, \qquad [3]$$

$$h(n) = 0 \text{ for } n \le -\frac{M}{2} \text{ and } n \ge \frac{3M}{2},$$

$$h(n) = h(M-n-1),$$

$$h(n)^2 + h(n+M)^2 = 1 \text{ for } -\frac{M}{2} \le n < \frac{M}{2}.$$

The transformation in equation [2] is known as the DCT-IV (Discrete Cosine Transformation of the fourth type) and has an efficient implementation comparable to the fast fourier transformation (FFT). The transformation in equation [2] will be referred to as the local DCT-IV. For a local DCT-IV the computational complexity is proportional to the product of the number of windows and the effort required to perform a DCT-IV is proportional to (N/M)*M log(M)=N log(M) N, where N is the signal length, i.e. the number of receivers per receiver line, and M is the window length. This compares favorably with an FFT over the entire length of the signal would require a number of operations that is proportional to N log(N).The major difference between this transformation and the ordinary local DCT is that it can be used with overlapping windows. The ordinary local DCT is restricted to rectangular disjoint windows.

As can be seen in equation [2], the calculation of each set of coefficients $\{c_{km}; \text{ with } k=0, \ldots, M-1\}$ requires the contribution of 2M receivers, M from within the window itself and M/2 from each neighboring window. Yet, the total number of transform coefficients equals the original number of data samples, i.e. p*M=N. The beginning and end of the data may be dealt with by assuming periodicity or by utilizing separate begin and end window functions.

The transform coefficients can be calculated simultaneously within the windows. Moreover, an efficient implementation exists in which the transformation in equation [2] is performed in two steps:

1. A folding step which determines a folded signal vector $f_m$ in every window m:

$$\vec{f}_m(n) = \vec{s}(n+mM)h(n) + \vec{s}(-n-1+mM)h(-n-1) \qquad [4]$$

for $0 \le n < M/2$; and $$\vec{s}(n+mM)h(n) - \vec{s}(2M-n-1+mM)h(2M-n-1)$$

for $M/2 \le n < M$.

2. A cosine transformation of the folded signal $f_m$ thus $$\vec{C}_{km} = \sum_{n=0}^{M-1} \vec{f}_m(n)\sqrt{\frac{2}{M}}\cos\left(\frac{\pi}{M}\left(k+\frac{1}{2}\right)\left(n+\frac{1}{2}\right)\right) \qquad [5]$$

for k=0, . . . , M−1 and for m=0, . . . , P−1.

In IEEE ASSP, vol.38, No.6., June 1990, Lapped transforms for efficient transform/subband coding, H. S. Malver discusses the properties and implementation of the local DST-IV (Discrete Sine Transformation of the fourth type), which equals the local DCT-IV except that the cosine is replaced by a sine.

Stage 2: Temporal Transformation

The local DCT-IV coefficients are still a function of recording time. In the proposed method a local temporal DCT-IV is also applied to them. The length to the window and the window function are chosen independently from the ones used in the local spatial DCT-IV.

The notation of vector $c_{km}$ is unaltered although the other ordinate no longer simply refers to time.

Figure 5:
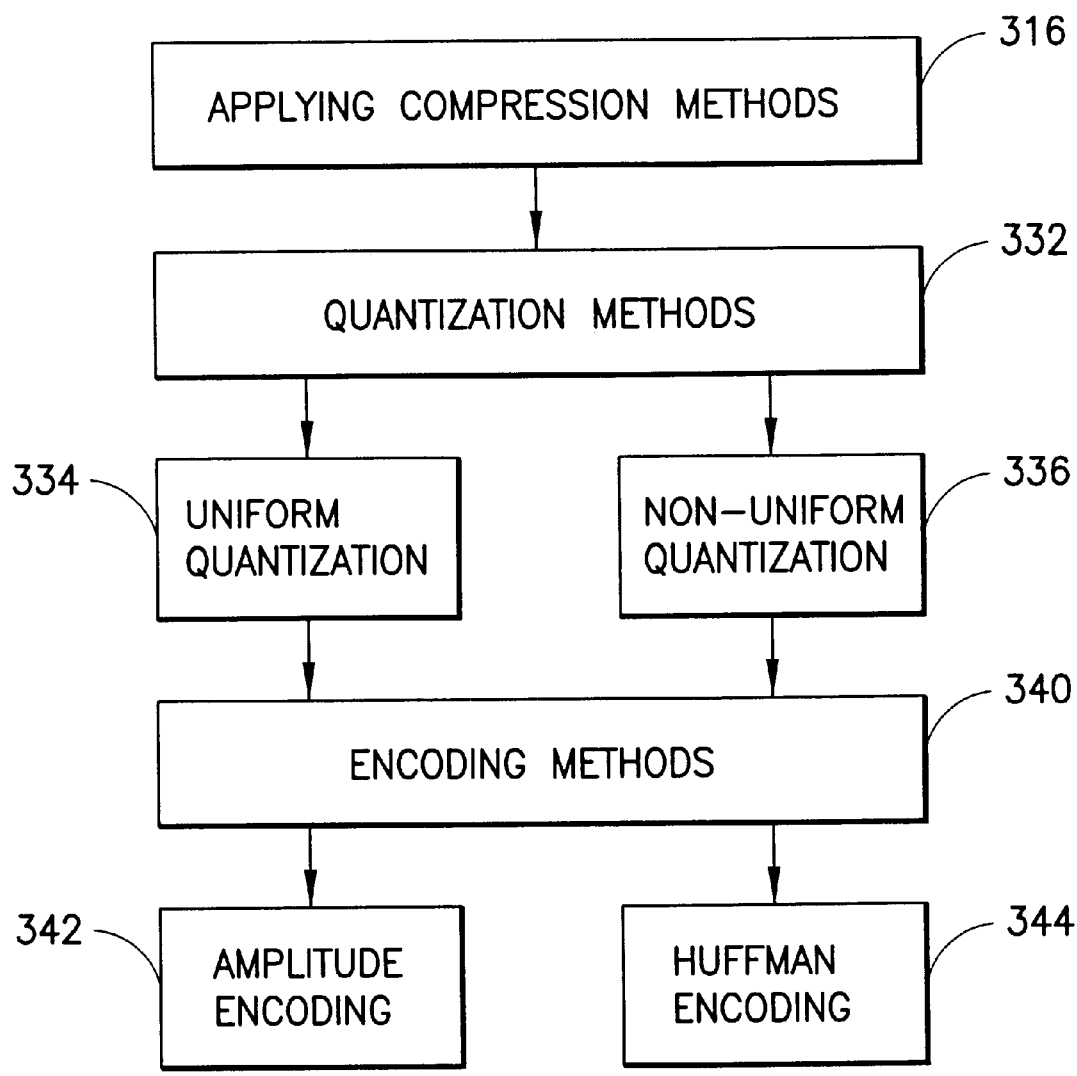
FIG. 5 is a chart showing various methods of data compression that can be used, according to preferred embodiments of the invention.

Stage 3: Requantization (FIG. 5, Step 332)

A convenient property of orthonormal invertible transformations is that they are energy preserving, that is, they satisfy Parseval's theorem. This means that the squared quantization error in the transform domain equals the resulting squared error in the original domain. The same is true for the squared error in the original domain. The same is also true for the squared error relative to the total data energy. However such a preservation property does not exist for the maximum absolute amplitude of the data.

Quantization involves dividing the amplitude range of the data, such as the coefficients, and reducing the amount of data present by rounding the amplitudes to allocate another amplitude value in accordance with the particular quantization used.

The most common method of quantization is uniform quantization (FIG. 5, step 334): the amplitude range is divided into equal steps and the amplitudes are rounded off to the midpoints. This results in a fixed point (integer) representation of the data samples. If the step size (say Δ) is sufficiently small, the quantization error is uniformly distributed white noise with variance or energy $\Delta^2/12$. If uniform quantization is applied in the transform domain, the quantization error in the original domain will also behave as white noise with unchanged energy. The quantization error in the original domain need not be uniformly distributed. These statements fail to be true if a non-uniform quantizer is used (FIG. 5, step 336). One may think of a quantizer that has decreasing accuracy for increasing amplitude, such as is used in a floating point representation.

If large compression ratios are to be achieved, the quantizer becomes coarse with respect to some parts of the data (in the transform domain). The stochastic analysis of the error then begins to fail and filtering of the data in the transform domain occurs. If, however, a transformation is used that gives a good compaction of the seismic data content, as with the DCT-IV, the most important components of the data are safeguarded from this filtering effect.

The coefficients of the local spatial DCT-IV represents the local spatial frequency content of the seismic data, i.e. in window number m the coefficients vector $\vec{c}_{km}$, k=0, . . . , M−1 represent the spatial frequency content. The index k determines the spatial frequency under consideration. A low k corresponds to a low local spatial frequency, a high k to high local spatial frequency.

The method involves the separate requantization of the low and the high local spatial frequency content. This may be done by regular rounding (or uniform quantizing) the $c_{km}$'s to give $$\vec{c}_{km} = NINT(\vec{c}_{km}/\delta_L)\delta_L \qquad [6]$$

for $0 \leq k \leq k_m - 1$, and $$\vec{c}_{km} = NINT(\vec{c}_{km}/\delta_H)\delta_H \qquad [7]$$

for $k_m \leq k \leq M-1$,
where equation [6] applies for low local spatial frequencies and equation [7] applies for high local spatial frequencies. In these two equations NINT is the nearest integer function, $k_m$ is the number of local DCT-IV coefficients at high accuracy and $\delta_L$, $\delta_H$ the scalars used in the rounding of the spatial frequencies. In the above expressions, the quantization error becomes larger as $\delta_L$ and $\delta_H$ become larger. To retain the low local spatial frequency at a higher accuracy than the high local spatial frequency content, the scalars are chosen so that $\delta_L < \delta_H$. The larger the scalar or quantization error is, the less number of bits per sample are required and the more compression can be achieved.

Hence, adjusting the values of those scalars provides a method for automatically selecting the compression ratio. One method of adjusting the scalars is to, firstly, determine an estimate for the noise in the recorded seismic data. This can be done by comparing parts of the recorded signal which are known to be free of seismic signals, i.e., preferably parts of the data recorded before the first arrival or data recorded during so-called noise shots. From this "signal-free" data, an estimate of the noise can be derived by conventional statistical methods. Given this estimate the scalars for the compression can be adjusted in a predetermined relation to it. Also, the more coefficients are reduced in accuracy (i.e. the smaller $k_m$ is) the more compression can be achieved. For example, given a data signal level of −10 dB and a noise level of −50 dB (measured using data from signal-free part of the data) the scalars can be set to achieve at least a compression ratio of 18:1.

The required separation between the low (conventional) and high (additional) wavenumber band cannot be perfect in a local or windowed approach. A small amount of leakage of quantization noise from the high into the low wavenumber band is unavoidable. In order to minimize noise leakage, the window design for the quantization noise in the local cosine coefficients is carefully selected. By also sacrificing some of the compression performance a satisfactory low level of leakage can be achieved. The design of the windows is discussed in stage 0 below.

Stage 4: Amplitude Encoding

To further compress the data, advantage may be taken of the reduction in accuracy, hence the reduction in the number of bits per sample, which increases the redundancy in the data. This is capitalized upon by amplitude encoding (FIG. 5, step 342) of the transform coefficients (the $c_{km}$'s). To this purpose, runs of a small number (typically 8) of coefficients are formed. In each run the largest absolute value determines the number of bits to be used for the coefficients. In the code each run of coefficients has to be preceded by the number of bits that is used, or more compactly by code that is obtained by Huffman coding the required number of bits per run (FIG. 5, step 344).

Stage 0: Parameters Settings and Window Design

This stage is required to select the window function and the requantization parameters.

The method preserves the low spatial frequency content of the data while reducing the accuracy of the high spatial frequency content. As explained earlier, this is done by manipulating the accuracy of local DCT-IV coefficients that represent the local spatial frequency content of the seismic data. In the inline application above it is possible to predict theoretically the effect of requantizing the local spatial frequencies, i.e. the local spatial DCT-IV coefficients, on the spatial frequency content of the data along the entire receiver line.

In the spatial frequency band a distinction is made between those considered to be low and those considered to be high. It is unavoidable that the accuracy of the low spatial frequency content of the data as observed over the entire receiver line suffers from the reduction in accuracy in the high local spatial frequencies.

The actual loss in accuracy incurred in the low spatial frequencies is determined by the window function h (also involving its length 2M), by the number of local DCT-IV coefficients at high accuracy $k_m$ and by the selected accuracy determined by $\delta_L$ and $\delta_H$.

The method involves a window design procedure which consists of the following steps:

specify the low spatial frequency band along the receiver line;

set a threshold on the maximally acceptable loss acceptable loss of accuracy in the low spatial frequency band, preferably in relation to a predetermined estimate of the noise in the data;

select M, $k_m$, $\delta_L$ and $\delta_H$;

minimize the loss of accuracy in the low spatial frequency band over all allowed window functions h (from equation [3]);

if the resulting loss of accuracy is below the threshold terminate the procedure otherwise increase the number of local DCT-IV coefficients at high accuracy ($k_m$) and repeat the previous step.

The quantities that influence the amount of leakage of quantization noise level ($\Delta$), the local cut-off index ($k_m$), the length M used in the DCT-IV and finally the window length ($\leq 2M$) and shape. To minimize leakage, $\Delta$ required to be as small as possible and $k_m$ and M as large as possible. However to maximize compression, $\Delta$ is required to be as large and $k_m$ as small as possible. In the window design M and $\Delta$ are fixed. Using an initial choice for $k_m$ the noise leakage is minimized with respect to the window h. If the noise exceeds a leakage threshold the cut-off index $k_m$ is increased and a new window is calculated.

A small real data example is now presented where the following applies:

128 receivers, hence the number of spatial frequencies is 64;

spatial window length M=16, hence the spatial window function length 2M=32;

number of spatial windows P=8;

1024 samples per receiver at a time of 4 ms;
temporal window length is 64 samples;
24 bit fixed point sample values.

The low spatial frequency band is chosen to consist of the 4 lowest spatial frequencies (8 real valued Fourier coefficients). This implies that the number of local DCT-IV coefficients at high accuracy per window (i.e. $k_m$) has to be at least 1, since the number of windows is 8.

Figure 2:
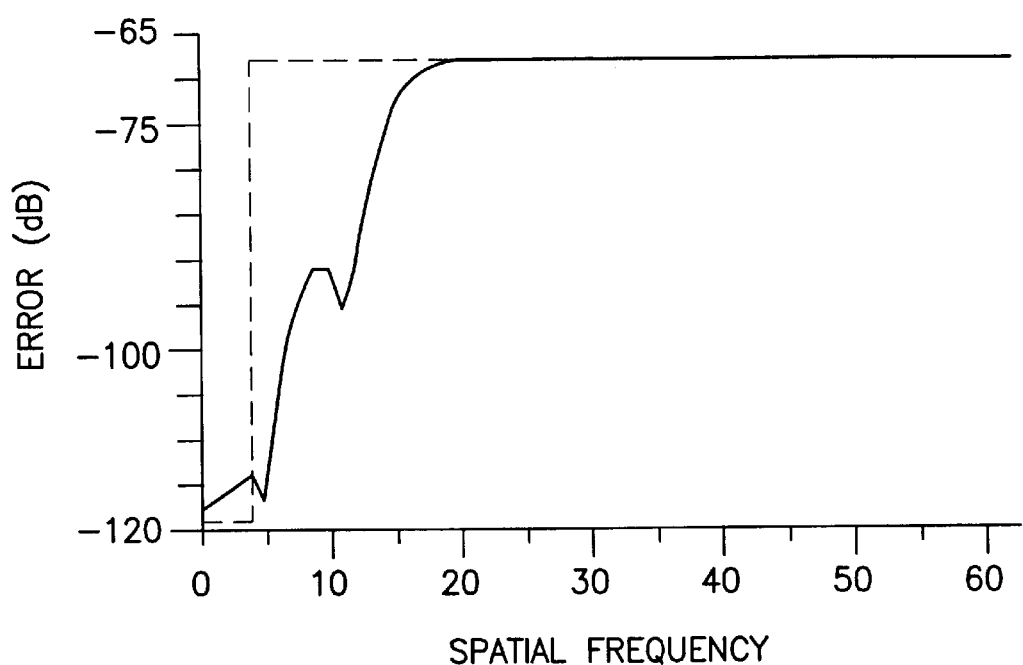
FIG. 2 shows a graph depicting the predicted scaling or quantization error in the spatial frequency domain when using the method according to the invention.

The threshold on the quantization error in the low spatial frequency band was set to −115 dB. The low quantization error was set to −119 dB and the high quantization error to −68 dB. During (preliminary experiments using this example) the error only dropped below the threshold if the number of local DCT-IV coefficients at high accuracy ($k_m$) was increased from 1 to 4. This means that 25% of the coefficients are retained at high accuracy (4 in every window of 16). The designed window is depicted in FIG. 1. The predicted quantization error is shown in FIG. 2 together with a rectangular curve showing the division between the low and high spatial frequencies.

Figure 3:
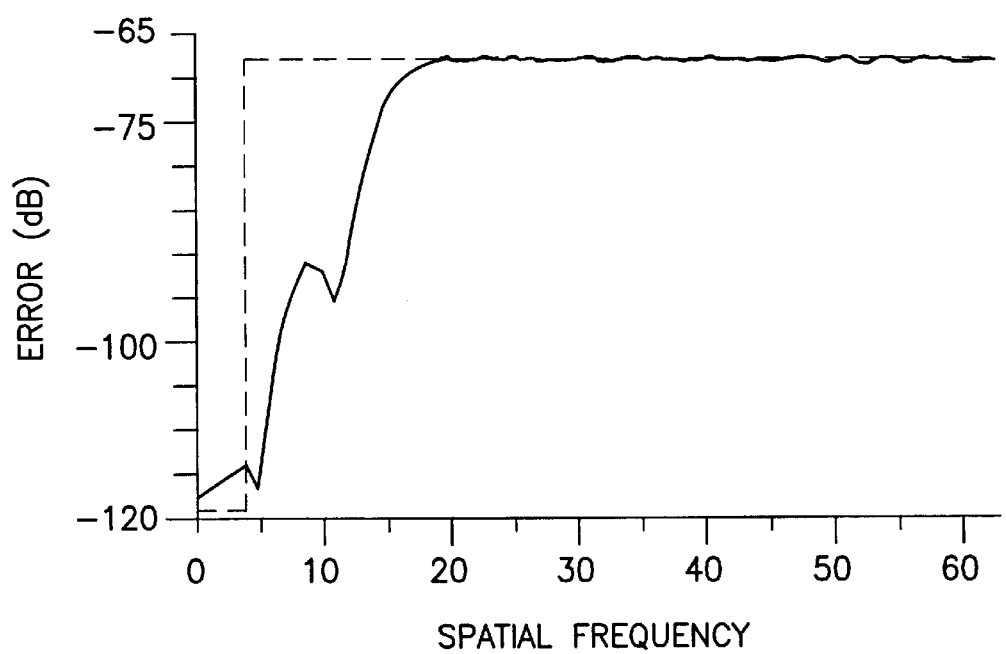
FIG. 3 shows a graph depicting the actual scaling or quantization error in the spatial frequency domain when using the method according to the invention.
Figure 4:
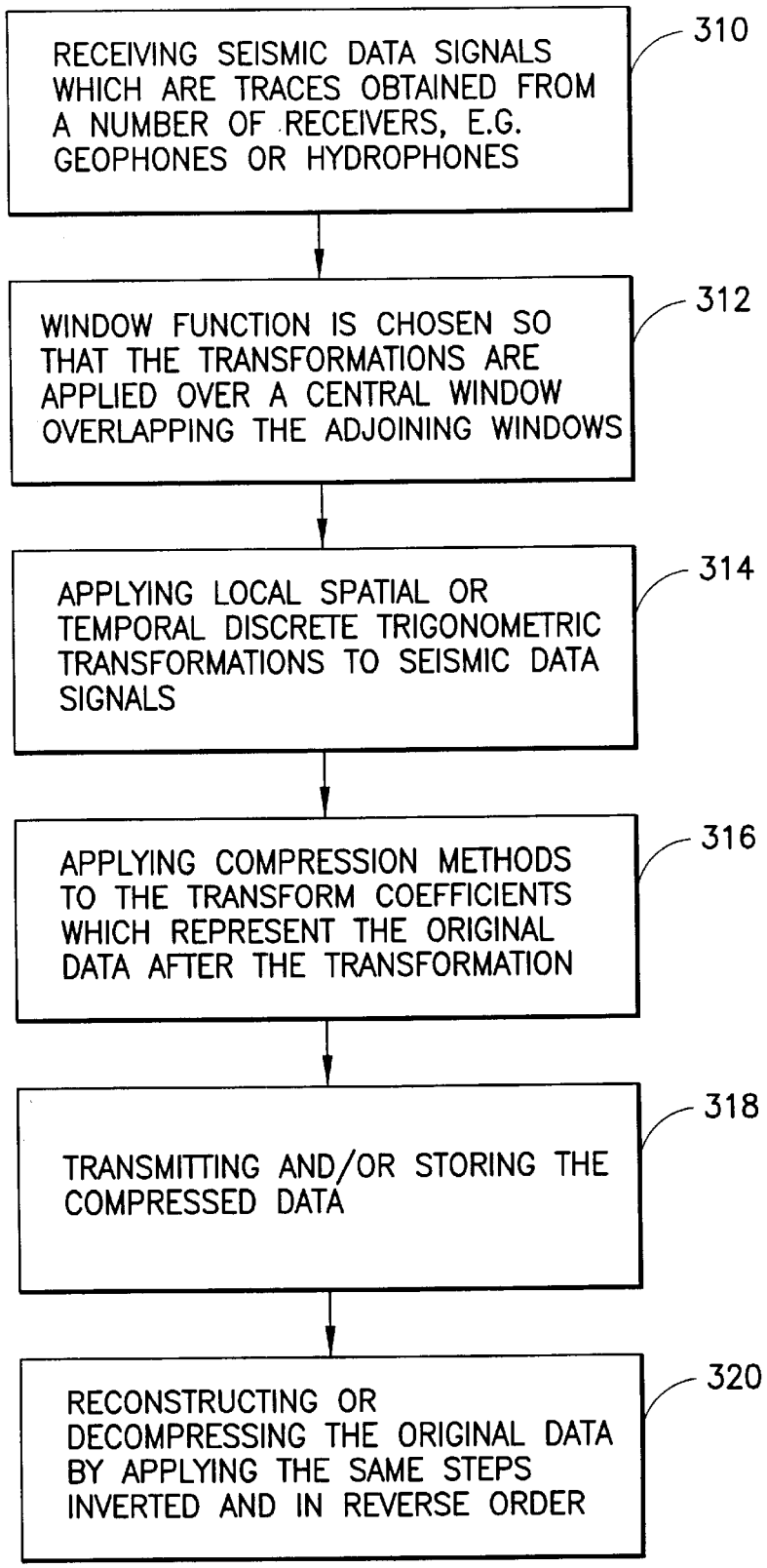
FIG. 4 is a flow chart showing steps of a compression method for seismic data based on a discrete trigonometric transformation, according to a preferred embodiment of the invention.

The quantization error obtained from the real data is depicted in FIG. 3. A good agreement can be observed between the predicted and the actual quantization error.

The original data is 24 bit fixed point. The number of bits per local DCT-IV coefficient used to obtain the required accuracy is 26 for the low DCT-IV coefficients (25%) and 17 for the high DCT-IV coefficients (75%). This is an initial compression to an average of 19.25 bits per sample. However, the increased redundancy enables the amplitude encoding in stage 4 to reduce this to an average of 4.4 bits per sample.

In another embodiment the main objective is not to have the data compression method interfere with the data as would have been acquired conventionally. This implies that the sum of groups of receivers (the conventionally acquired group formed result) is to be retained at high accuracy whereas the rest of the seismic data is represented at reduced accuracy. The implementation of this embodiment is simpler than the first embodiment. The method involving the FFT and the linear arrays is as follows:

Stage 1: Spatial Transformation $$\vec{f}_{km} = \sum_{n=0}^{M-1} \vec{s}_m(n) e \exp\left(\frac{-2\pi i n k}{M}\right) \quad [8]$$

for k=0, ..., M−1 and for all m.

The window size (M) is simply equal to the group size ($N_g$). The group number is here given as a subscript m in the data vector $s_m(n)$ to show that all groups are dealt with separately and that they may be at an angle with the receiver line.

Stage 2: Temporal Transformation

For the temporal transformation, use is made of a temporal local DCT-IV as in the first embodiment (Section 3.1).

Stage 3: Requantization

The requantization is done similarly to equations [6] and [7] in the first embodiment, i.e.

$$\vec{f}_{km} = NINT(\vec{f}_{0m}/\delta_L)\delta_L \quad [9]$$

(the sum) and $$\vec{f}_{km} = NINT(\vec{f}_{km}/\delta_H)\delta_H \quad [10]$$

for $1 \leq k \leq M-1$ (the high local spatial frequencies).

Stage 4: Amplitude Encoding

The amplitude encoding is performed as described in the first embodiment.

Since in this embodiment only the sum of groups of receivers is preserved at high accuracy it is not restricted to seismic acquisition geometric utilizing receiver lines with linear arrays. It can be applied, for instance, to an acquisition geometry with areal arrays.

Other embodiments can be as the ones discussed above but with
 a) stage 1 and 2 interchanged;
 b) any other method of requantizing the coefficients in equations [6] and [7] in stage 3. For instance, statistical rounding or non-uniform requantization (FIG. 5, step 336);
 c) the requantization parameters in equations [6] and [7] varying with time, position or frequency;
 d) an odd window length M;
 e) the window length not constant in the local spatial or temporal DCT-IV;
 f) the DST-IV instead of the DCT-IV;
 g) the local temporal DCT-IV in stage 1 replaced by any other signal transformation or decomposition such as a (local) DCT, a local DST, a (local/short-time) FFT, a wavelet transformation or a subband decomposition;
 h) the local spatial DCT-IV replaced by any other signal transformation or decomposition such as a (local) DCT, a local DST, a (local/short-time) FFT, a wavelet transformation or a subband decomposition;
 i) the amplitude encoding in stage 4 replaced by any other method of exploiting the data redundancy.

What is claimed is:

1. A compression method for seismic data representing measurements from one or more seismic receivers, said method comprising the steps of:
 applying an invertible local spatial and/or temporal discrete trigonometric transformation to said seismic data over a window that overlaps at least one adjoining window, thereby generating data in the transform domain; and
 compressing said data in the transform domain.

2. The method according to claim 1, wherein the trigonometric transformation applied has an implementation with efficiency at least comparable to that of the fast fourier transformation.

3. The method according to claim 1, wherein the trigonometric transformation when applied has a computational complexity proportional to the number of samples in the signal.

4. The method according to claim 1 wherein said seismic receivers are arranged as part of a large array comprising a plurality of lines of receivers.

5. The method according to claim 4 wherein the local trigonometric transformation used permits the compression of the seismic data from a predetermined number of receivers in each line.

6. The method according to claim 1 wherein the local trigonometric transformation used satisfies the condition that the sum of the squared quantization error in the transform domain equals the sum of the resulting squared error in the original domain.

7. The method according to claim 1 wherein the local trigonometric transformation used is an orthonormal transformation.

8. The method according to claim 1 further comprising the step of combining the window with adjoining windows to produce a folded signal.

9. The method according to claim 1, wherein the local trigonometric transformation used and the inverse of the local trigonometric transformation used are equivalent.

10. The method according to claim 1, wherein the data in the transform domain is compressed by a requantization of the data in the transform domain.

11. The method according to claim 10, wherein the data in the transform domain is compressed by a uniform quantization method.

12. The method according to claim 10, wherein the data in the transform domain is compressed by a non-uniform quantization which involves retaining greater accuracy for lower frequencies than for higher frequencies.

13. A data compression method according to claim 1, wherein an estimate of the noise in the uncompressed data is determined and a compression ratio for the compression is automatically selected in accordance with said estimate.

14. A data compression method according to claim 1, wherein a reduced redundancy in the data in the transform domain is used to further reduce the compressed data.

15. A data compression method according to claim 1, wherein the data in the transform domain is compressed by variable-length coding.

16. The method of claim 1 further comprising the steps of:

transmitting and/or storing compressed data; and decompressing and inversely transforming said compressed data.

17. The method according to claim 1 wherein the discrete trigonometric transformation is a discrete sine or cosine transformation.

18. The method according to claim 17 wherein the discrete trigonometric transformation is of type DCT-IV or DST-IV.

19. A compression method for seismic data representing measurements from one or more seismic receivers, said method comprising the steps of:

automatically determining a compression ratio using measurements of the seismic data; and compressing the seismic data according to the compression ratio, said compression ratio being determined by estimating a noise level in said seismic data.

20. The method according to claim 19 further comprising the step of measuring part or parts of the seismic data which contain no signal generated by a seismic source, and wherein the step of automatically determining comprises the steps of:

utilizing the measured part or parts of the seismic data to determine an estimate of the noise level; and choosing the compression ratio to be equal or lower than the estimated noise level.

21. The method according to claim 20 wherein the part or parts of the seismic data which contain no signal is recorded prior to the first arrival of a signal generated by the seismic source.

22. The method according to claim 19 further comprising the steps of applying a local spatial and/or temporal discrete trigonometric transformation to said seismic data over a window that overlaps at least one adjoining window, thereby generating data in the transform domain.

23. The method according to claim 22 wherein the data in the transform domain is compressed by a quantization of the data in the transform domain.

24. The method according to claim 23 wherein the quantization uses one or more scalars that are adjusted in accordance with a predetermined relation to the estimated noise level.

25. An apparatus for compressing seismic data that represents measurements from one or more seismic receivers, said apparatus comprising means for applying a local spatial and/or temporal discrete trigonometric transformation to said seismic data over a window that overlaps at least one adjoining window, thereby generating data in the transform domain; and means for compressing said data in the transform domain.

26. The apparatus according to claim 25 wherein the discrete trigonometric transformation is an invertible discrete sine or cosine transformation.

27. The apparatus according to claim 26 wherein the discrete trigonometric transformation is of type DCT-IV or DST-IV.

* * * * *